M. J. QUINN.
FOOT OR CHECK VALVE.
APPLICATION FILED NOV. 18, 1915.

1,211,877.

Patented Jan. 9, 1917.

WITNESSES

INVENTOR
MARTIN J. QUINN

UNITED STATES PATENT OFFICE.

MARTIN JOSEPH QUINN, OF TORONTO, ONTARIO, CANADA.

FOOT OR CHECK VALVE.

1,211,877. Specification of Letters Patent. Patented Jan. 9, 1917.

Application filed November 18, 1915. Serial No. 62,150.

*To all whom it may concern:*

Be it known that I, MARTIN JOSEPH QUINN, of the city of Toronto, in the county of York, in the Province of Ontario, Canada, have invented certain new and useful Improvements in Foot or Check Valves, of which the following is the specification.

My invention relates to improvements in foot or check valves and the object of the invention is to devise a simple valve of this type in which all liability to leakage will be absolutely prevented under all conditions and it consists essentially of a valve head and a seat therefor, having an annular rim a thin flexible washer, a disk supporting same and resilient means pressing the washer against the upper edge face of the valve seat rim the parts being arranged as hereinafter more particularly explained in the following specification.

Figure 1:
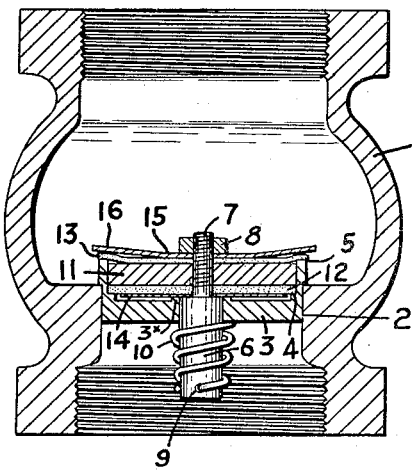
Figure 5:
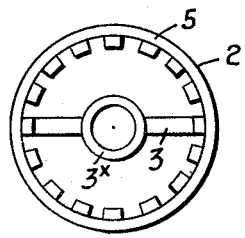
Figure 2:
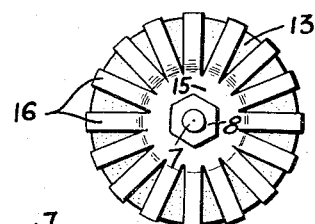
Figure 3:
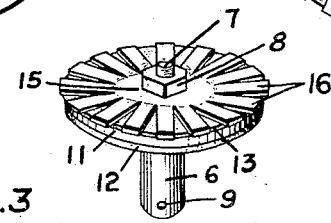
Figure 4:
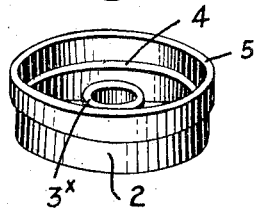

Figure 1 is a cross section through a valve casing containing a valve having my improvements. Fig. 2 is a plan view of my valve head. Fig. 3 is a perspective view of my valve head. Fig. 4 is a perspective view of my valve seat. Fig. 5 is a plan view of a modification of my valve seat.

In the drawings, like letters of reference indicate corresponding parts in each figure.

1 indicates the valve casing containing an annular valve seat 2.

3 indicates a bridge extending diametrically across the interior of the valve seat 2, having an annular bearing 3$^\times$ located centrally thereof.

4 indicates the lower valve seat.

5 indicates an annular flange forming an upper valve seat. 6 indicates a spindle having a reduced threaded portion 7 carrying the nut 8, and hole 9 supporting a spring 10.

11 indicates a metallic disk forming the valve head carried by the threaded portion 7 of the spindle 6.

12 and 13 indicate flexible washers carried by the spindle 6.

14 indicates a metallic disk carried by the spindle 6 and supporting the washer 12.

15 indicates a metallic disk having resilient extending portions 16.

Having described the principal parts involved in my invention I will briefly describe the operation of the same.

The valve seat 2 is secured to the casing 1, while the valve head comprising the washers 12 and 13 the disks 11, 14 and 15 and the nut 8 are carried on the spindle 6 sliding in the bearing 3$^\times$ of the valve seat 2.

The valve is closed by the spring 10 which passes through the hole 9 in the spindle 6 and presses against the bridge 3 of the valve seat thereby exerting a pressure on the disk 15 which presses the washer 13 against the upper valve seat 5. As additional security against leakage the washer 12 supported between the disks 11 and 14 may be added bearing against the lower valve seat 4. When the lower washer is not used, the lower valve seat is cut in vertical grooves as shown in Fig. 5 as this type of projection to support the disk 11 is less likely to lodge dirt than a continuous ledge. When the lower washer 12 is used the disk 14 is added to support the washer and the lower valve seat is in the form of a continuous ledge as shown in Fig. 4.

The washers at present in use are of a thickness defined by the span from the spindle to the valve seat and are therefore of a thickness such that, when an obstruction becomes lodged between the washer and the valve seat, the washer being thick cannot fit snugly around the obstruction and therefore a leak occurs around the obstruction. By the use of my device a very thin washer may be used, supported from below by the disk 11 and pressed tightly to the upper valve seat by the resilient fingers 16 of the disk 15. The purpose of the resilient extending portions 16 is to apply a pressure to the washer 13 in such a way that if an obstruction becomes lodged between the washer and the valve seat the resilient portions will give and the washer being thin and flexible will mold itself around the obstruction and prevent any leakage.

When the lower washer is not used the disk 14 is also dispensed with and the disk 11 may be made thicker or made an integral part of the spindle 6 and the spindle 6 instead of having a reduced threaded portion 7, and nut 8 as shown may have an internally threaded hole and a screw inserted therein, the head of said screw pressing against the top of the disk 15.

Hence although I have fully described one form which my invention may take many minor changes may be made without departing from the spirit of the invention.

This improvement is applicable to pump valves and ordinary check valves and the valve may be either in the vertical or horizontal position. In the ordinary pump valve now in use the washer bears on several transverse radial portions, the rubber in a short time bulges into the spaces between these portions and being thick is permanently distorted and when the valve head turns slightly the bulged part of the washer rests on the transverse portion and a leak ensues because the washer, being thick and therefore not flexible, cannot adapt itself to irregularities of the valve seat, whereas in my valve the whole central portion of the washer is supported, and cannot be depressed or distorted out of shape while the portion bearing on the valve seat is flexible and can adapt itself to any irregularities of the valve seat.

What I claim as my invention is:

1. In a valve of the class described, a lower valve seat, such seat having annular flanges forming an upper valve seat, a valve head co-acting with said lower seat, said flanges projecting beyond the main upper surface of the valve head, and a flexible washer co-acting with the upper seat.

2. In a valve, the combination with an annular valve seat of a flexible washer having its outer edge portion bearing against the upper edge of the valve seat, means for supporting the central portion of the washer, and resilient means held on and projecting beyond the central portion for pressing the outer edge of the washer against its seat.

3. In a valve, the combination with an annular valve seat, of a valve head, a flexible washer bearing on the valve seat having the central portion thereof carried by the head, and spring fingers also carried by the head bearing against the upper face of the outer edge portion of the washer.

4. In a valve, the combination with a valve seat having an upper and lower seating surface, of a valve head co-acting with the lower seat and having its upper face located below the face of the upper seat, a washer below the head, a flexible washer secured to the upper face of the head and extending radially beyond the outer periphery thereof, the extended end resting upon the upper face of the upper valve seat.

5. In a valve, the combination with a valve seat having an upper and lower seating surface, of a valve head co-acting with the lower seat and having its upper face located below the face of the upper seat, a washer below the head, a flexible washer secured to the upper face of the head and extending radially beyond the outer periphery thereof, the extended end resting upon the upper face of the valve seat, and spring means bearing upon the top of such extended end at independent points and means bearing upon the top of said washer.

6. In a valve, the combination with a valve seat having an upper seating surface and a lower seating surface having notches extending vertically through the seat, of a valve head co-acting with the lower seat, a flexible washer carried by the head and having its outer edge portion bearing against the upper valve seat and resilient means for holding such outer edge portion against its seat.

7. In a device of the class described, a valve head comprising a body portion, a flexible washer extending radially beyond the body portion and having its central portion supported by the body portion, and resilient seating means pressing against the upper surface of the outer edge portion of the washer.

8. In a device of the class described, a valve head comprising a body portion, a flexible washer extending radially beyond the body portion and having its central portion supported by the body portion, and spring fingers carried by the body portion bearing against the upper face of the outer edge portion of the washer.

MARTIN JOSEPH QUINN.

Witnesses:
M. EGAN,
V. LONG.

Copies of this patent may be obtained for five cents each, by addressing the "Commissioner of Patents, Washington, D. C."